United States Patent
Johnson

(10) Patent No.: US 10,775,662 B2
(45) Date of Patent: Sep. 15, 2020

(54) THIN LCD DIRECT-LIT BACKLIGHT WITH LOW COST HEATER

(71) Applicant: Rockwell Collins, Inc., Cedar Rapids, IA (US)

(72) Inventor: Rick J. Johnson, Shellsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 153 days.

(21) Appl. No.: 15/853,218

(22) Filed: Dec. 22, 2017

(65) Prior Publication Data

US 2019/0196272 A1 Jun. 27, 2019

(51) Int. Cl.
*G02F 1/1333* (2006.01)
*G02F 1/13357* (2006.01)

(52) U.S. Cl.
CPC .. *G02F 1/133382* (2013.01); *G02F 1/133603* (2013.01); *G02F 1/133606* (2013.01); *G02F 2001/133612* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 2010/0123839 A1* | 5/2010 | Lu | ...................... | G02B 27/2264 349/15 |
| 2011/0149198 A1* | 6/2011 | Kim | .................. | G02F 1/133308 349/58 |
| 2011/0255047 A1* | 10/2011 | Kim | .................. | G02F 1/133382 349/161 |
| 2012/0099049 A1* | 4/2012 | Yamazaki | ......... | G02F 1/133603 349/64 |

* cited by examiner

*Primary Examiner* — Phu Vu
(74) *Attorney, Agent, or Firm* — Suiter Swantz pc llo

(57) ABSTRACT

A direct-lit LED backlight for a liquid crystal display (LCD) based avionics display unit may include a two-dimensional high density array of mid-power LED units mounted to a circuit card. A diffuser layer for scattering and spreading the luminous output of the LED array throughout the full LCD stack may be airlessly adhered (e.g., without the need for an air gap) to the LED array, and to the LCD stack, by bond layers of thermally conductive transparent optical adhesive. The circuit card may include embedded resistive heaters for conductively heating the LCD stack to optimize performance, or the LCD stack may be heated by the LED array itself. The backlight may include night vision filtering layers similarly and airlessly adhered between the LED array and the LCD stack by the optical bond layers.

7 Claims, 3 Drawing Sheets

THIN LCD DIRECT-LIT BACKLIGHT WITH LOW COST HEATER

BACKGROUND

Liquid crystal display units (LCD) incorporate non-luminous display elements that must be illuminated by a backlight mounted behind the display surface. For example, an LCD stack (e.g., the layer or layers of liquid crystal display elements and their corresponding drive electronics) may be directly backlit by an array of light emitting diodes (LED), as opposed to, e.g., an edge-lit backlight which employs luminous elements at the edges of the display surface, the luminous output thereof being reflected into the display elements. However, conventional direct-lit backlights, wherein the spacing of the LED array ranges from about two to 10 LEDs per square inch, require a significant air gap (e.g., approximately 0.75 inches), adding to the bulk and weight of the display unit. Further, for the LCD unit to achieve desired response times (e.g., 20 ms or less) the liquid crystal display elements must be heated to above 0° C. This heating is typically achieved via transparent conductive materials such as indium tin oxide (ITO) embedded in the glass. However, ITO heaters are expensive, add weight, and inhibit optimal optical performance; for example, the ITO heaters are about 80% transmissive and thus greater LED luminosity (and correspondingly greater backlight power) is required to achieve the same luminance.

SUMMARY

In one aspect, embodiments of the inventive concepts disclosed herein are directed to a direct-lit backlight for a liquid crystal display (LCD) unit. The backlight includes a two-dimensional high density array of small-scale mid-power light emitting diodes (LED) set into a circuit card, the LED array and circuit card airlessly bonded to a diffuser (e.g., for scattering and spreading the luminous output of the LED array) by a layer of thermally conductive, transparent optical adhesives. An additional optical bond layer may airlessly bond the top/forward side of the diffuser layer (e.g., proximate to the viewer) to an LCD stack, such that the LCD display elements are backlit by the LED output.

In a further aspect, embodiments of the inventive concepts disclosed herein are directed to an LCD-based (e.g., flat panel) avionics display unit installable aboard an aircraft, e.g., as a flight display in the aircraft cockpit. The display unit includes an LCD stack of arrayed liquid crystal display elements (e.g., coupled to drive electronics and graphics generators for determining the images and/or symbology displayed by the display elements). The display unit includes an LED backlight for illuminating the arrayed display elements. The backlight includes a two-dimensional high density array of LEDs set into a circuit card, and drive electronics for supplying power to the LED array. The backlight includes a diffuser layer for scattering and spreading the luminous output of the LED array, the diffuser layer airlessly bonded to the LED array and circuit card by a bond layer of thermally conductive, transparent optical adhesive. A second bond layer airlessly bonds the top/forward side of the diffuser layer to the LCD stack, such that the luminous output of the LED array (as well as start-up heat, from embedded heaters or the LED array itself) is conducted through the bond layers to the LCD stack.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
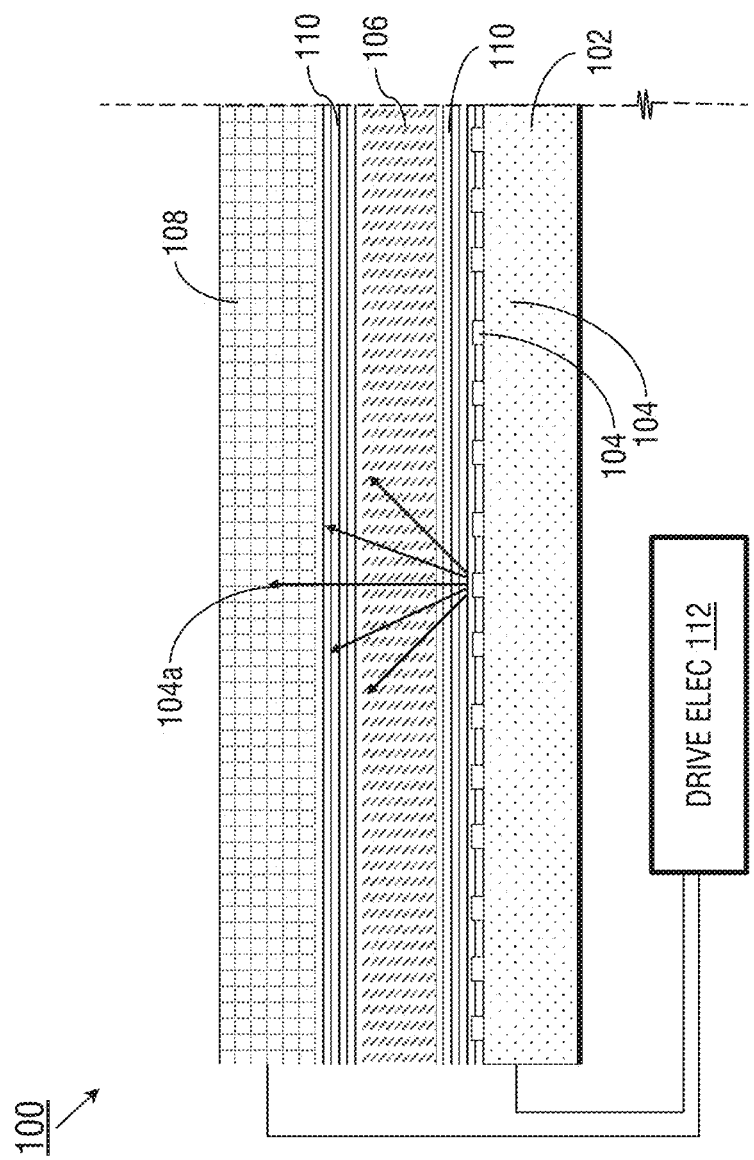
FIG. 1 illustrates an exemplary embodiment of a direct-lit backlight according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for a thin direct-lit light emitting diode (LED) based backlight for a liquid crystal (LCD) based avionics display unit installable aboard an aircraft. The backlight incorporates miniature LEDs deployed in a high density array, eliminating the need for an air gap and significantly reducing the overall depth of the backlight. Costly and performance-inhibiting indium tin oxide (ITO) conductive heaters may be eliminated, further reducing the weight and power needs of the backlight.

Referring to FIG. 1, an exemplary embodiment of a direct-lit LED backlight 100 for an LCD display unit may include a circuit card 102, a two-dimensional array of individual LEDs 104 arranged thereon, a diffuser layer 106, an LCD stack 108, optical bond layers 110, and drive electronics 112. For example, the diffuser layer 106 may incorporate diffusers and/or lightguides for manipulating the luminous output (104a) of the array of individual LEDs (104) toward the LCD stack 108; the diffuser layer may scatter or spread the luminous output 104a evenly across the full surface of the LCD stack such that a uniform luminance is achieved (and to hide individual LEDs), or otherwise direct the luminous output toward the LCD stack according to a predetermined pattern. The individual LEDs 104 may be disposed in a high density array across the circuit card 102, which may incorporate a substrate layer of conductive material through which power lines to the LEDs may be run from the drive electronics 112. Each individual LED 104 may be a mid-power LED (e.g., 1 W), an organic LED (OLED), or a micro-LED having dimensions both thinner and lighter than conventional LEDs, e.g., one square millimeter (1 mm×1 mm) or less, or sized according to a target density (e.g., per square inch). Accordingly, the individual LEDs 104 may be arranged in a high density array (as opposed to conventional direct-lit LED arrays including, e.g., two to 10 LEDs per square inch) for uniform luminosity at a reduced depth. Similarly, the direct-lit LED backlight 100 requires no air gap; the diffuser layer 106 may be airlessly adhered to the LED array 104 by an optical bond layer 110 consisting of a layer of transparent optical adhesive, with no airspace remaining between the LED array 104, the optical bond layer 110, and the diffuser layer 106. For example, the optical bond layers 110 may incorporate flexible, pliable layers of thermally conductive optical adhesives, such that the luminous output (104a) of the LEDs 104 is not adversely affected or absorbed.

Figure 2:
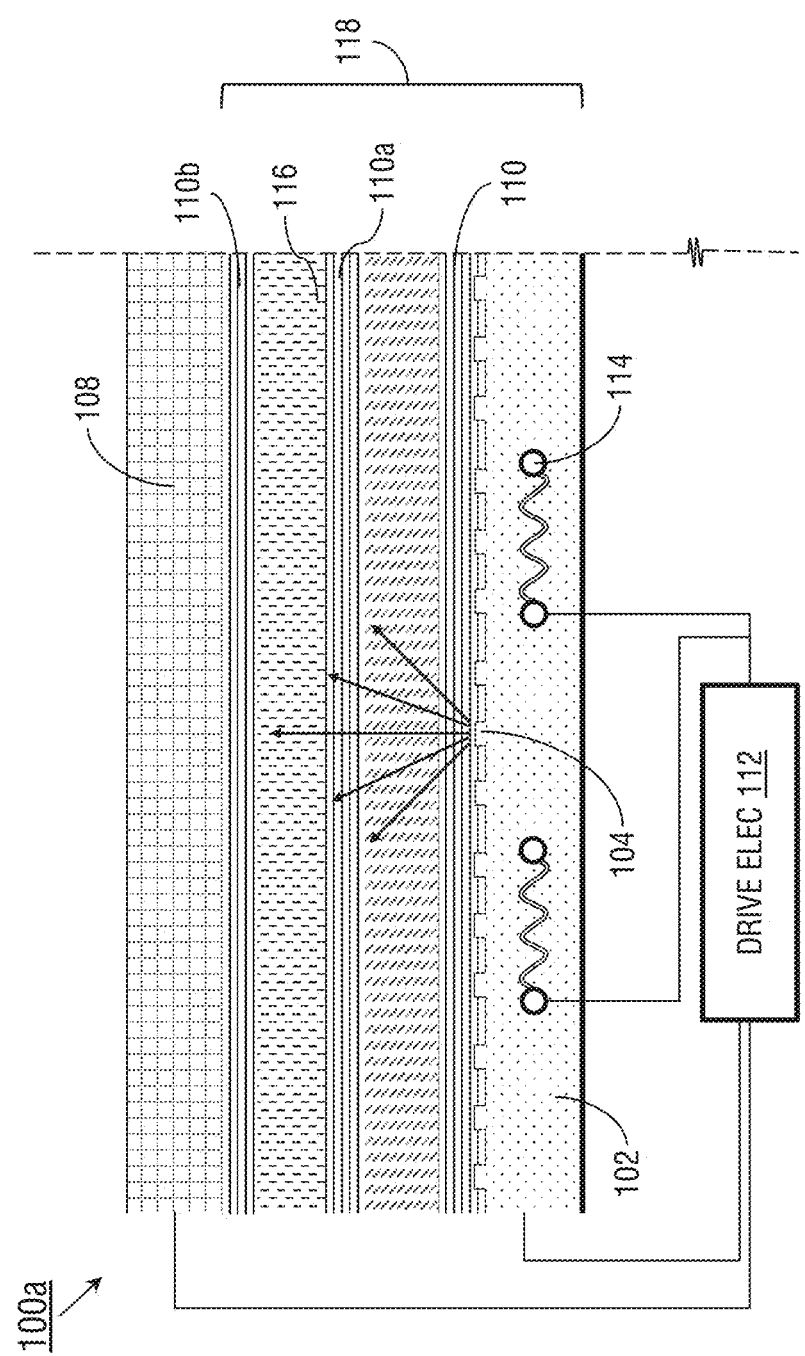
FIG. 2 is a diagrammatic illustration of the direct-lit backlight of FIG. 1.

Referring to FIG. 2, the direct-lit backlight 100a may be implemented and may function similarly to the direct-lit backlight 100 of FIG. 1, except that the direct-lit backlight 100a may include resistive heaters 114 or similarly appropriate discrete heating elements embedded in the circuit card 102 and supplied with power by the drive electronics 112 to provide startup heat for the LCD stack 108; rather than embedding an ITO heater directly behind the LCD stack, the output of the resistive heaters 114 may be conducted toward the LCD stack by the thermally conductive optical bond layers 110. Alternatively, the drive electronics 112 may provide startup heat to the LCD stack 108 via the LED array 104. For example, upon activation of the LCD display unit, the drive electronics 112 may apply an increased amount of power (as opposed to normal operations) to the LED array 104 in order to conductively heat the LCD stack 108 to an optimal operating temperature, while the LCD surface remains black to the viewer (or displays a simple indicator that the LCD stack 108 is heating).

Further, the LCD-based avionics display unit may include a night vision (NVIS) filter layer (116) for optimizing the luminous output 104a so as to be optimally compatible with NVIS goggles or any appropriate similar passive NVIS system used by a pilot or crewmember. For example, the NVIS filter layer 116 may be disposed between the diffuser layer 106 and the LCD stack 108. Additional optical bond layers (110a-b) may airlessly and respectively adhere the diffuser layer 106 to the NVIS filter layer 116, and the NVIS filter layer 114 to the LCD stack 108. Alternatively, the NVIS filter layer 116 may be disposed behind the diffuser layer 106, e.g., between the diffuser layer 106 and the circuit card 102/LED array 104, similarly and airlessly adhered to both the diffuser layer and the circuit card/LED array by an optical bond layer. The elimination of the air gap may simplify packaging of the direct-lit backlight 100, 100a by providing for a single backlight unit (e.g., including the circuit card 102 and LED array 104, diffuser layer 106, NVIS filter layer 114, and optical bond layers 110, 110a-b; as opposed to multiple components or groups of components) having a reduced depth (118), e.g., less than 0.25 inches.

Figure 3:
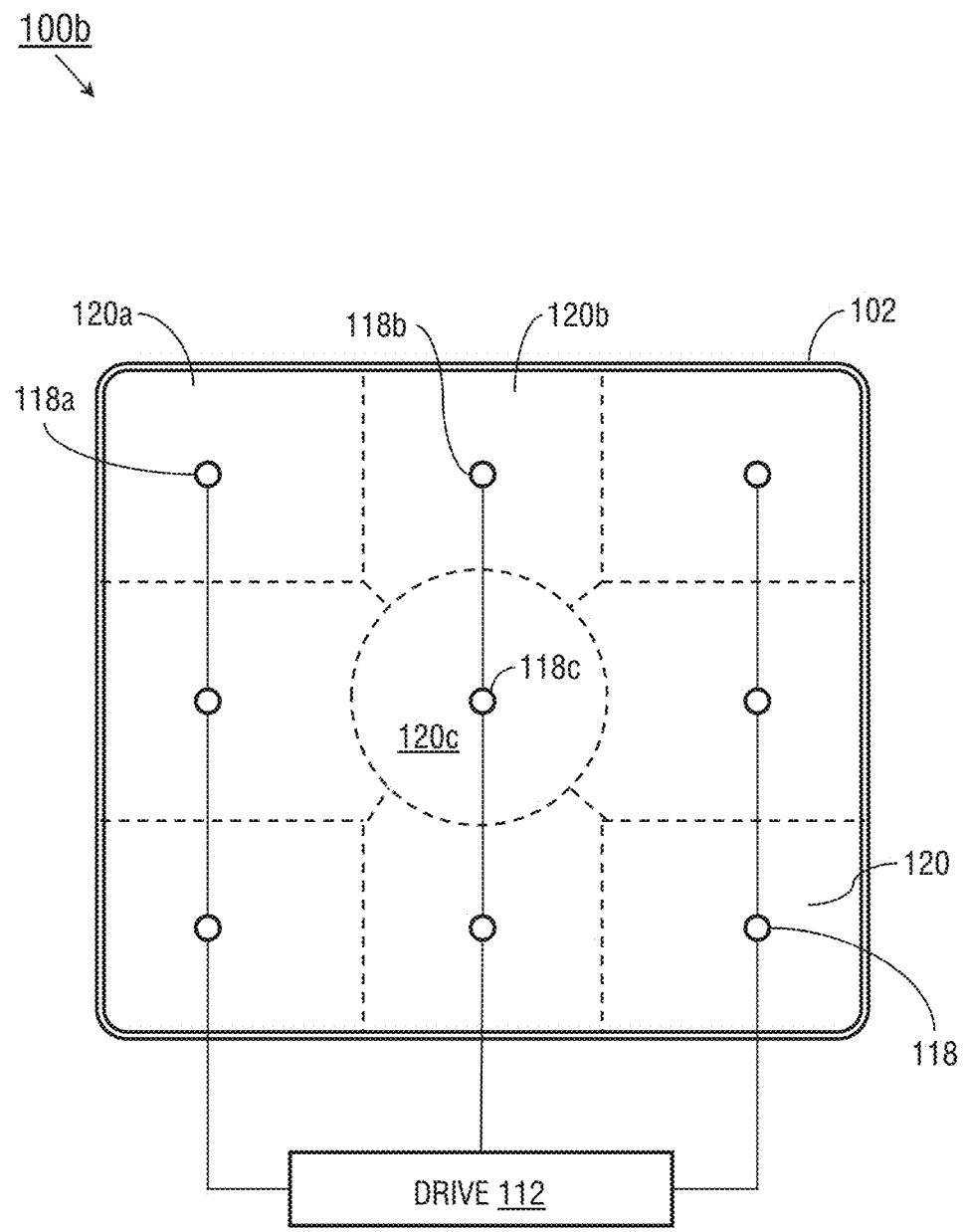
FIG. 3 is a diagrammatic illustration of a circuit card of the direct-lit backlight of FIG. 2.

Referring to FIG. 3, the direct-lit backlight 100b may be implemented and may function similarly to the direct-lit backlight of FIG. 2, except that the direct-lit backlight 100b may include temperature sensors (118) distributed throughout the circuit card 102. For example, the temperature sensors 118 may report to a controller of the LCD display unit as to the current temperature of a particular zone (120) of the LCD stack (108, FIG. 2) proximate to the temperature sensor. For example, zones (120a-b) nearer the edges of the LCD stack 108 may be cooler than zones (120c) near the center. By receiving temperature information from multiple sensors 118a-c proximate to various zones 120a-c throughout the LCD stack 108, the drive electronics 112 may apply power to the various zones at varying levels depending on the reported temperatures, or heat the LCD stack 108 as a whole via the temperature sensors 118a-b proximate to the edges.

As will be appreciated from the above, systems and methods according to embodiments of the inventive concepts disclosed herein may provide lighter, thinner, and more cost-effective backlighting for both commercial off the shelf (COTS) and custom-designed LCD-based avionics display units. The backlight depth may be significantly reduced, and the overall power consumption may be decreased without sacrificing performance by the incorporation of smaller, mid-power LEDs and the elimination of expensive, bulky and complex ITO heating elements.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A liquid crystal avionics display unit installable aboard an aircraft, comprising:
    an LCD stack including a first array of display elements and comprising a plurality of zones;
    a backlight configured to illuminate the first array of display elements and comprising:
    a two-dimensional array of light-emitting diodes (LED) configured to generate a luminous output, the array of LEDs mounted to a circuit card in an evenly spaced apart relationship;
    drive electronics coupled to a power source, the drive electronics configured to supply power to the array of LEDs;
    at least one diffuser layer configured to scatter the luminous output toward the LCD stack;
    and
    one or more optical bond layers incorporating at least one optical adhesive, the one or more optical bond layers including at least:
        a first optical bond layer adhering the diffuser layer to the circuit card;
        and
        a second optical bond layer adhering the diffuser layer to the LCD stack;
    one or more heating elements coupled to the drive electronics, the heating elements configured to provide startup heat to the LCD stack, the startup heat associated with an activation of the LCD stack;
    a plurality of temperature sensors proximate to the circuit card, the plurality of temperature sensors including:
        a first temperature sensor proximate to a first zone of the LCD stack, the first temperature sensor configured to report at least one first temperature corresponding to the first zone,
        and
        at least one second temperature sensor proximate to a second zone of the LCD stack, the second temperature sensor configured to report at least one second temperature corresponding to the second zone;
    the drive electronics configured to supply power to the one or more heating elements associated with at least one of the first zone and the second zone based on at least one of the first temperature and the second temperature.

2. The direct-lit backlight of claim 1, wherein the one or more heating elements includes at least one resistive heater embedded within the circuit card.

3. The direct-lit backlight of claim 1, wherein the one or more heating elements includes at least one first LED of the array of LEDs.

4. The direct-lit backlight of claim 1, further comprising:
    at least one night vision (NVIS) filtering layer disposed between the circuit card and the LCD stack and configured to filter the luminous output.

5. The direct-lit backlight of claim 4, wherein the first optical bond layer comprises:
    a first lower optical bond layer adhering the circuit card and the array of LEDs to the NVIS filtering layer;
    and
    a first upper optical bond layer adhering the NVIS filtering layer to the diffuser layer.

6. The direct-lit backlight of claim 4, wherein the second optical bond layer comprises:
    a second lower optical bond layer adhering the diffuser layer to the NVIS filtering layer;
    and
    a second upper optical bond layer adhering the NVIS filtering layer to the LCD stack.

7. The direct-lit backlight of claim 1, wherein the combined depth of the array of LEDs, the circuit card, the diffuser layer, the first optical bond layer, and the second optical bond layer is not greater than 0.25 inches.

* * * * *